[19] United States Patent
Miller

[11] 4,328,848
[45] May 11, 1982

[54] BOW SAW

[75] Inventor: Jack V. Miller, Pasadena, Calif.

[73] Assignee: Acroform Corporation, City of Industry, Calif.

[21] Appl. No.: 114,214

[22] Filed: Jan. 22, 1980

[51] Int. Cl.³ .............................................. B27B 21/00
[52] U.S. Cl. .................................. 145/33 R; 145/31 R
[58] Field of Search ............... 145/32 R, 31 R, 32 A, 145/32 B, 33 R, 33 A, 33 AB, 33 B, 33 E, 31 AB, 31 AC, 31 AD, 130; 83/846, 848, 851, 837, 835

[56] References Cited

U.S. PATENT DOCUMENTS

| 685,534 | 10/1901 | Smith | 145/32 R |
| 1,214,589 | 2/1917 | Rasmussen | 145/31 R |
| 2,399,869 | 5/1946 | Hough | 145/33 R |
| 2,634,994 | 4/1953 | Legassey et al. | 145/33 R |
| 3,805,383 | 4/1974 | McNally | 83/846 |

FOREIGN PATENT DOCUMENTS

| 741168 | 2/1933 | France | 83/846 |
| 198291 | 9/1965 | Sweden | 145/33 A |
| 475313 | 11/1937 | United Kingdom | 83/846 |
| 493972 | 10/1938 | United Kingdom | 145/33 R |
| 933188 | 8/1963 | United Kingdom | 145/33 D |

Primary Examiner—Stephen G. Kunin
Assistant Examiner—J. T. Zatarga
Attorney, Agent, or Firm—Wagner & Bachand

[57] ABSTRACT

A bow saw useful for camping, backpacking, tree pruning, wood cutting, and like outdoor usages particularly, which comprises a rigid tubing having opposed differentially dimensioned distal and proximal ends defining opposed saw blade receiving slots in a common plane, a saw blade having differentially proportioned distal and proximal end portions singularly orienting the blade relative to the bow in the bow slot received condition of the blade, and blade retaining apparatus carried by the blade within the bow tubing in blade distal and proximal end portion defining relation.

5 Claims, 11 Drawing Figures

BOW SAW

REFERENCE TO RELATED APPLICATIONS

Reference is hereby made to copending patent application, Ser. No. 114,215 filed Jan. 22, 1980 for an Improved Blade for Reciprocating Saw, particularly usable in the Improved Bow Saw of this invention and application Ser. No. 114,216 for an improved folding saw.

BACKGROUND OF THE INVENTION

This invention has to do with bow saws, and more particularly is concerned with light weight bow saws of advantageous operating characteristics and which have assured proper assembly, built-in storage, and great ease of assembly and disassembly.

It is known to have a light weight saw useful for pruning, wood cutting or for cutting on camping and backpacking outings. Heretofore, however, the advantages in the present saw of readiness of assembly, ease of operation, and built-in storage capability for the blade have not been afforded.

SUMMARY OF THE INVENTION

It is accordingly an object of the present invention to provide an improved form of bow saw, and more particularly a bow saw which is made of light weight tubing, the tubing being adapted to receive the saw blade in stored relation, and which is provided with means insuring proper assembly of the saw for ready use.

These and other objects of the invention are realized in a bow saw having a bow comprising rigid tubing having opposed, differentially dimensioned distal and proximal ends defining opposed saw blade receiving slots in a common plane, a saw blade having differentially proportioned distal and proximal end portions singularly orienting the blade relative to the bow in a bow slot received condition of the blade, and blade retaining means carried by the blade within the bow tubing in blade distal and proximal end portion defining relation.

Typically the bow is assymetrically arched, the saw blade has teeth angled for relatively more efficient cutting of the workpiece on drawing toward the proximal end of the blade, the bow tubing is generally circular in cross section between its ends and oppositely ovaled at its distal and proximal ends relative to the slot common plane to differentially dimension the tubing at these ends for registration solely with the corresponding blade distal and proximal end portions.

The blade retaining means may typically comprise distal and proximal end portion carried slot engaging structure assymetrically located in end portion defined relation, and spaced from each other a distance relative to the opposed slot spacing to tension the blade in its mounted condition on the bow. The blade may be longitudinally flexible and sized relative to the bow inside diameter to be storable within the bow. Further the blade may be lengthwise proportioned relative to the bow to project slightly from the bow in stored condition therein.

The blade receiving slots typically are inwardly tapered to facilitate blade edge entry thereinto.

The retaining means may comprise a stop shoulder, and means supporting the stop shoulder on the blade in slot wall engaging relation. Thus, the invention contemplates a rivet having a head defining the stop shoulder and an aperture in the blade adapted to receive and retain the rivet. In these last mentioned embodiments the bow may be assymetrically arched, the highest point of the bow assymetrical arch may be adjacent the bow proximal end and there may be further provided handgrip means adjacently below the arch highest point. As in earlier embodiments the blade in these embodiments may have teeth biased for relatively more efficient cutting of the workpiece in drawing toward the proximal end of the bow, in pushing toward the distal end of the bow or toward either end of the bow.

In a preferred embodiment, the bow tubing is generally circular in cross section between its ends and oppositely ovaled at its distal and proximal ends relative to the slot common plane to differentially dimension the tubing at these ends and respectively proportionately to the blade distal and proximal end portions in singular blade orientation determining relation.

In a highly particularly preferred embodiment there is provided in accordance with the invention a bow saw comprising assymetrical tubing arch of generally circular cross section defining a bow having a proximal end adjacently below the highest point of the arch and a distal end there opposite, the distal and proximal ends defining blade receiving slots in a common plane; and a blade for the bow having cooperating distal and proximal ends, the blade carrying slot engaging rivets adapted to removably support the blade on the bow in tensioned relation, the blade having differently extended end portions beyond the rivets respectively at the distal and proximal ends; the bow tubing being dimensionally varied from its circular cross section beyond its blade receiving slots to accommodate selectively the respective cooperating end portions of the blade.

BRIEF DESCRIPTION OF THE DRAWINGS

The invention will be further described to as illustrative embodiment in which.

DESCRIPTION OF THE PREFERRED EMBODIMENTS

Figure 1:
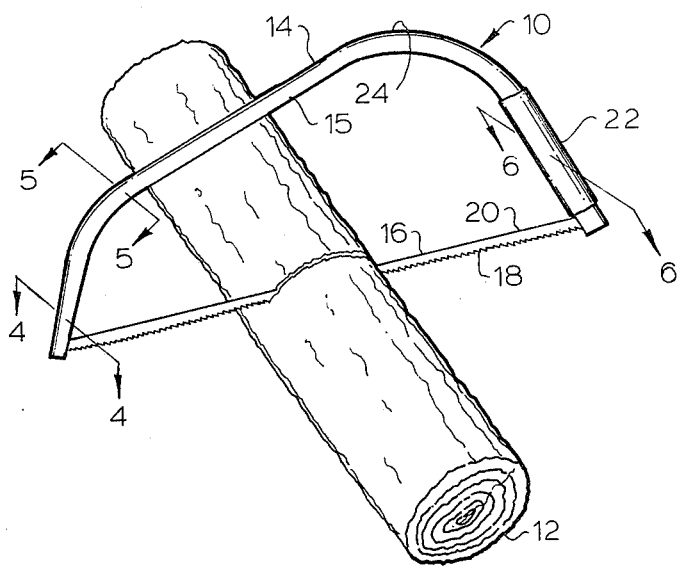
FIG. 1 is a perspective view of the bow saw according to the invention in use on a log workpiece.

With reference now to the drawings in detail, in FIG. 1 the bow saw of the invention is shown at 10, sawing through a workpiece, log 12. The saw 10 is seen to comprise a bow 14, formed by an assymetrical arch of lightweight, e.g. aluminum, tubing 15, a blade 16 having a longitudinal row of teeth 18 on the lower lengthwise edge 20 of the blade, blade retaining means, best shown in the other FIGURES, and a handgrip 22. The handgrip 22 is located adjacently below the highest point of the bow arch, indicated at 24. So located the handgrip 22 enables more than ample gripping area, and the draw and push operation of the bow saw is most nearly analogous to the conventional saw operation which is similarly grasped with the "handle" rising well above the operating hand.

Figure 5:
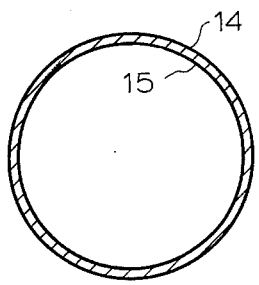
FIG. 5 is a view in vertical cross section taken on line 5—5 in FIG. 1.

The bow 14 is interiorly hollow and generally circular in cross section through most of its extent, as is evident from a consideration of FIG. 5. The tubularity of the bow 14 enables storage of the saw blade 16 therein by relatively sizing the blade and bow tubing 15 for this purpose. See FIGS. 2, 7, 8, and 9.

The just discussed features are important in a camping saw and another feature of the present saw is equally desirable: That is the ease of proper assembly for use, after storage or when setting up camp. For this purpose the present invention provides means for fool-proof assembly with the proper blade mounting. It may first be noted that saws work more or less easily depending on the rake or angle of the teeth, the spread of the teeth and other factors which blade manufacturers build into their saw blades. Incorrect assembly can frustrate the manufacturer's intentions and even result in overly difficult operation, binding, breakage, and even hand and eye injuries.

Figure 6:
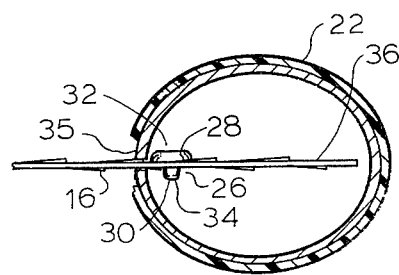
FIG. 6 is a view in horizontal cross section taken on line 6—6 in FIG. 1.
Figure 7:
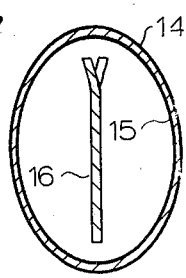
FIG. 7 is a view taken on line 7—7 in FIG. 2.
Figure 8:
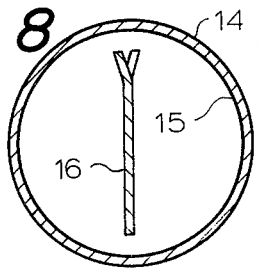
FIG. 8 is a cross section view taken on line 8—8 in FIG. 2.
Figure 9:
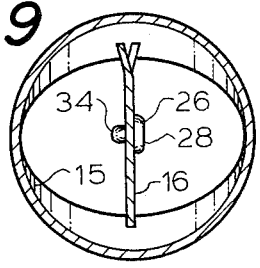
FIG. 9 is a view in cross section taken on line 9—9 on FIG. 2.

Accordingly, the saw blade 16 and cooperating bow 14 of the invention are particularly relatively configured to avoid such problems. Initially and with reference to FIGS. 3, 4, and 6 the saw blade 16 is terminally mounted by retaining means shown in the form of rivets 26 having a head portion 28 defining a stop shoulder, a shank portion 30 extending through a preformed aperture 32 in the saw blade, and an upset 34 formed on the shank beyond the blade aperture to anchor the rivet in position. The rivet 26 engages behind slot 35 formed in the tubing 15 to receive, tensionally support and retain the blade 16 in use position, the slot 35 in each end of the bow being in a common plane and inwardly tapered from the bow end for ease of blade insertion. It will be noted that the end portions of the blade left and right are of different lengths beyond the rivets 26 and defined thereby. Thus right end portion 36 is of greater extent than left end portion 38 as measured from the location of the rivet 26 in each portion.

Figure 2:
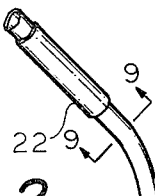
FIG. 2 is a perspective view of the bow saw with the blade stored within the bow arch.
Figure 4:
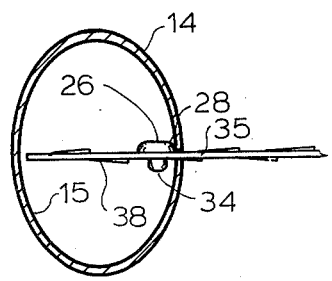
FIG. 4 is a view in horizontal section taken on line 4—4 in FIG. 1.

It will be further noted that the dimensions of the bow tubing 15 at the distal and proximal bow ends 40, 42 are likewise different. Thus, left bow end 40, the end remote from the user or as referred to herein the distal end is as best shown in FIG. 4, an oval rather than a circle and is disposed transversely to the plane of the blade mounting slots 35, while right bow end 42, the proximal end, is an oval disposed longitudinally of the plane of the mounting slots. The oppositely ovaled ends 40, 42 of the bow 14 provide a difference in dimension beyond the mounting slots 35 which as will be seen corresponds to the difference in the extent of the end portions 36, 38, whereby reverse insertion of the blade end portions is not possible, and the orientation of the blade can only be a singular way, the correct way. It may further be noted that the longitudinally ovaled bow end 42 is adapted to block passage of the saw blade 16 where the blade is inserted in the bow end 40, by virtue of the shift of 90 degrees in oval orientation, and blade loss in the tubing is avoided. In FIG. 2 the end of the blade protrudes for easy recovery, at 44, while the blade 16 rests within the bow 14, see FIGS. 7, 8, and 9.

A further feature, described and claimed in my co-pending application Ser. No. 114,215 referenced above, highly useful with proper orientation of the blade 16 being assured, is provision of a variable rake on the blade teeth, see FIG. 3, which is biased for more efficient cutting on drawing the blade through the workpiece toward the proximal end of the bow.

Figure 3:
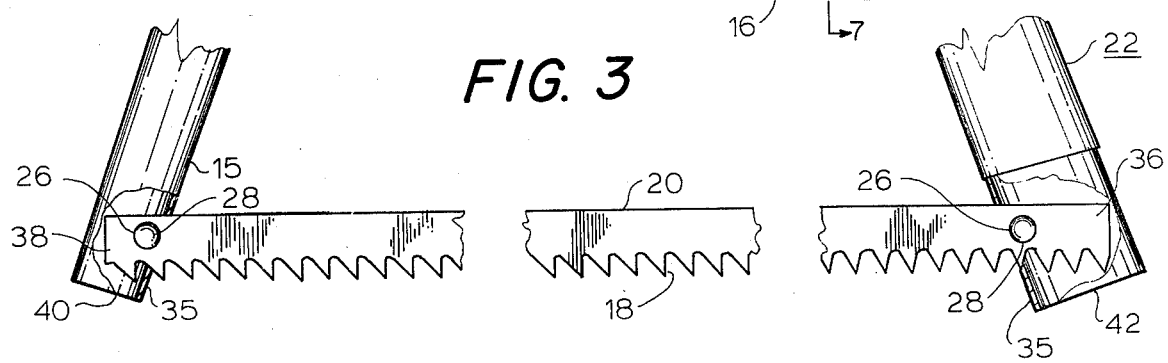
FIG. 3 is a fragmentary view in elevation of the bow saw with certain portions broken away to show underlying parts, the teeth being shown biased for more efficient cutting toward the proximal end of the blade.
Figure 10:
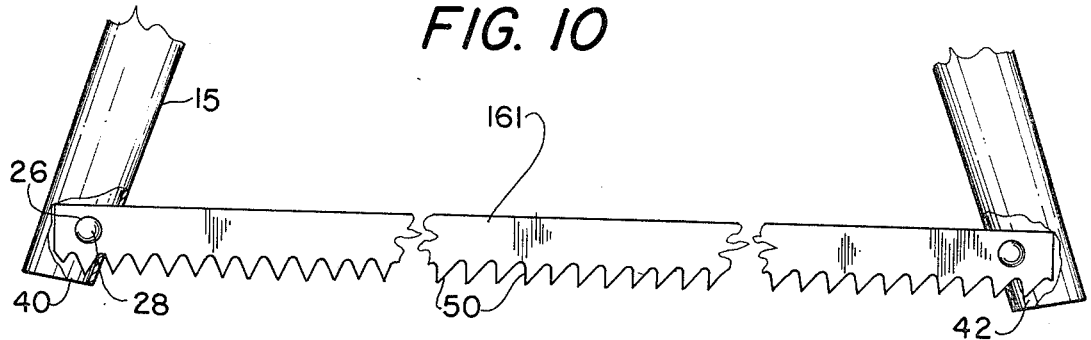
FIG. 10 is a view like FIG. 3 showing a blade with teeth biased for more efficient cutting toward the distal end of the blade.
Figure 11:
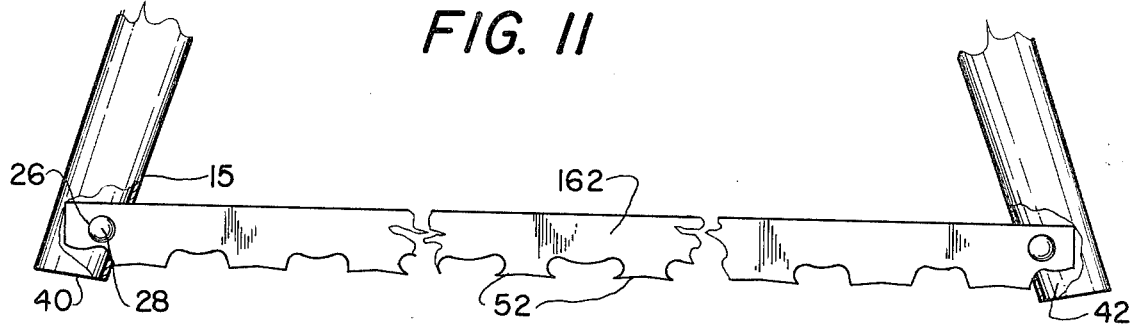
FIG. 11 is a view like FIG. 3 showing a blade with teeth biased for more efficient cutting toward either end of the blade.

As shown in FIG. 10, the blade teeth 50 on blade 161 may be reversed in rake angle relative to the FIG. 3 embodiment, and thus be biased for more efficient cutting on pushing the blade through the workpiece toward the distal end of the bow. And in FIG. 11, blade teeth 52 on blade 162 are shown which are configured to be biased in both directions, thus to be more efficient in cutting whether pulling or pushing, toward either the proximal or distal end of the bow.

I claim:

1. A bow saw comprising a hollow tubing having a pair of curved sections in a common plane presenting a distal and a proxal end, each end defining an opening therein and a pair of saw blade retaining slots in the adjacent wall regions of said distal and proxal ends, said distal and proxal ends having different internal distance between the respective saw blade retaining slots and the opposite internal wall thereof, a saw blade having slot retaining obstructions extending transverse to the thickness of the saw blade at each end region thereof and at different distances from the end at the opposite ends thereof, one of said obstructions farther from its end than the distance between one saw blade retaining slot and the opposite internal wall of one end of said bow saw, whereby said saw blade may be secured with said obstruction within said proxal and distal ends in one direction only.

2. The combination in accordance with claim 1 wherein said tubing is generally circular in cross section except for said distal and proxal end regions which are of generally oval configuration with the blade retaining slot in the broader oval wall of one of said ends and the blade retaining slot in the narrower oval wall whereby the end of said saw blade having the obstruction the greater distance from the adjacent end of said saw blade is securable only in the end of said tubing presenting the blade retaining slot in the narrow oval wall.

3. The combination in accordance with claim 1 wherein said obstructions comprise rivets extending through said saw blade and presenting greater thickness to said saw blade than the width of said blade retaining slots and said blade ends extending beyond said rivets a distance less than the internal dimension of said respective end from the slot to the opposite wall when positioned in the correct corresponding end of said tubing.

4. The combination in accordance with claim 1 wherein said tubing has an internal dimension in the circular region greater than the width of the saw blade whereby the blade may be stored within the tubing when not in use, the lesser internal dimension of at least one of the oval end regions being less than the width of the blade whereby said blade may be inserted in said tubing through said last mentioned oval end region with the blade oriented to deflect through at least one of said bends of said tubing.

5. The combination in accordance with claim 4 wherein said tubing is assymetrically arched with a lower arch adjacent the distal end and a higher arch adjacent said proxal end, said distal end including the oval end presenting its greater internal dimension normal to the plane of the saw blade retaining slots whereby said blade when inserted in the distal end of said tubing flexes through said lower arch into storage position.

* * * * *